United States Patent
Mullins et al.

(10) Patent No.: US 9,412,205 B2
(45) Date of Patent: Aug. 9, 2016

(54) EXTRACTING SENSOR DATA FOR AUGMENTED REALITY CONTENT

(71) Applicant: DAQRI, LLC, Los Angeles, CA (US)

(72) Inventors: Brian Mullins, Sierra Madre, CA (US); Matthew Kammerait, West Hollywood, CA (US); Christopher Broaddus, Mountain View, CA (US)

(73) Assignee: DAQRI, LLC, Los Angeles, CA (US)

( * ) Notice: Subject to any disclaimer, the term of this patent is extended or adjusted under 35 U.S.C. 154(b) by 164 days.

(21) Appl. No.: 14/467,428

(22) Filed: Aug. 25, 2014

(65) Prior Publication Data

US 2016/0055674 A1 Feb. 25, 2016

(51) Int. Cl.
*G06T 19/00* (2011.01)
*G02B 27/01* (2006.01)

(52) U.S. Cl.
CPC ............ *G06T 19/006* (2013.01); *G02B 27/017* (2013.01)

(58) Field of Classification Search
CPC .............................. G06T 19/006; G02B 27/017
See application file for complete search history.

(56) References Cited

U.S. PATENT DOCUMENTS

| | | | |
|---|---|---|---|
| 2009/0319058 A1 | 12/2009 | Rovaglio et al. | |
| 2013/0144482 A1* | 6/2013 | Tuukkanen | G06F 3/0482 701/29.6 |
| 2014/0009494 A1 | 1/2014 | Kasahara | |
| 2014/0160115 A1 | 6/2014 | Keitler et al. | |
| 2014/0267404 A1* | 9/2014 | Mitchell | G06T 19/006 345/633 |

OTHER PUBLICATIONS

"International Application Serial No. PCT/US2015/046282, International Search Report Nov. 30, 2015", 2 pgs.
"International Application Serial No. PCT/US2015/046282, Written Opinion mailed Nov. 30, 2015", 5 pgs.

* cited by examiner

*Primary Examiner* — Maurice L McDowell, Jr.
(74) *Attorney, Agent, or Firm* — Schwegman Lundberg & Woessner, P.A.

(57) ABSTRACT

A system and method for extracting data for augmented reality content are described. A device identifies a sensing device using an image captured with at least one camera of the device. Visual data are extracted from the sensing device. The device generates an AR content based on the extracted visual data and maps and displays the AR content in the display to form a layer on the sensing device.

20 Claims, 14 Drawing Sheets

US 9,412,205 B2

EXTRACTING SENSOR DATA FOR AUGMENTED REALITY CONTENT

TECHNICAL FIELD

The subject matter disclosed herein generally relates to the processing of data. Specifically, the present disclosure addresses systems and methods for extracting sensor data from sensing devices for augmented reality content.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
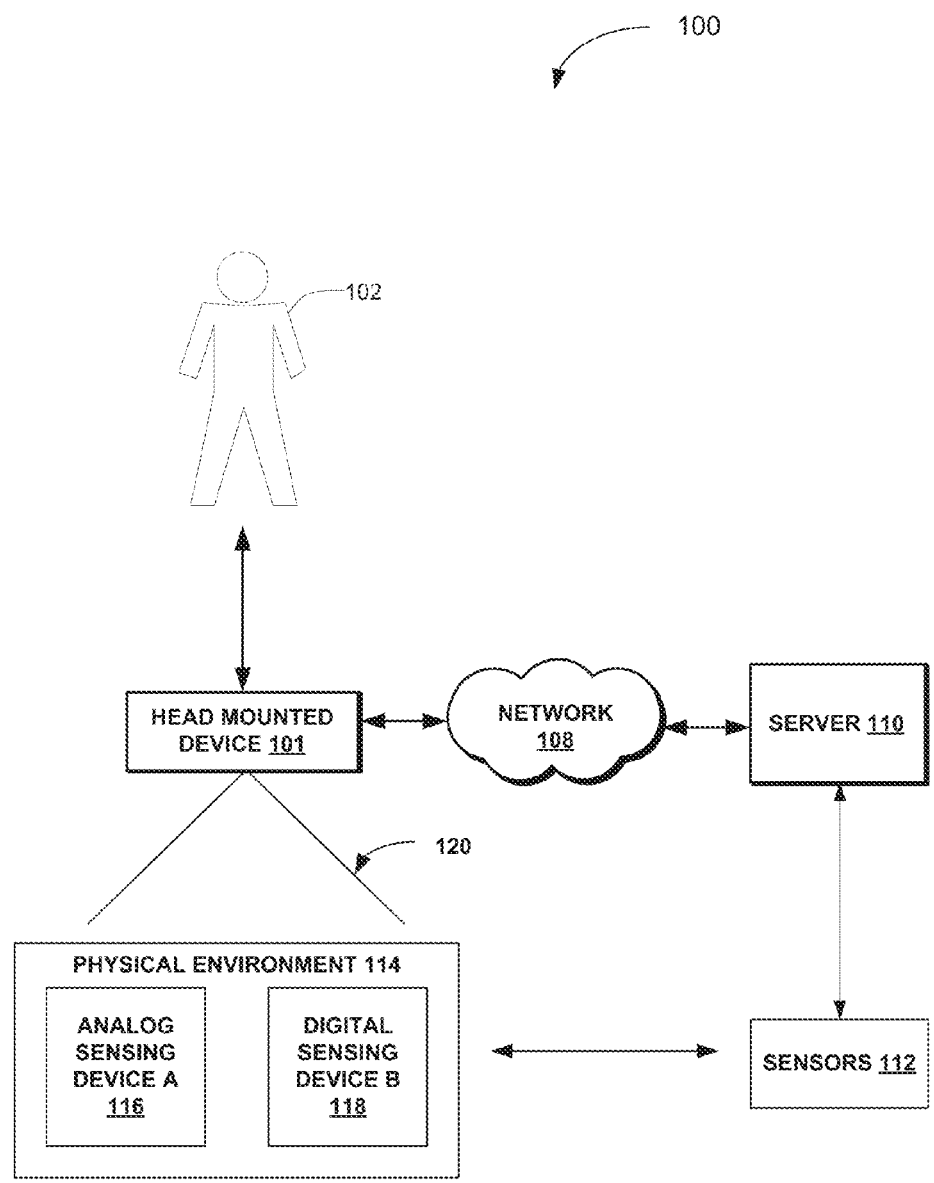
FIG. 1 is a block diagram illustrating an example of a network suitable for extracting data from devices for AR content, according to some example embodiments.

Example methods and systems are directed to extracting data from sensing devices for AR content. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object such as a three-dimensional virtual object overlaid on an image of a physical object captured with a camera of a device. The device may include a smartphone, a tablet, a wearable device or head mounted device such as eyeglasses or a helmet having optical sensors and a display. The physical object may include a visual reference (e.g., a recognized image, pattern, or object) that the AR application can identify using predefined objects or machine vision. A visualization of the additional information, such as the three-dimensional (3D) virtual object overlaid or engaged with a view or an image of the physical object, is generated in a display of the head mounted device. The display of the head mounted device may be transparent. The 3D virtual object may be selected based on the recognized visual reference or captured image of the physical object. A rendering of the visualization of the 3D virtual object may be based on a position of the display relative to the visual reference. Other AR applications allow a user to experience visualization of the additional information overlaid on top of a view or an image of any object in the real physical world. The virtual object may include a 3D virtual object, a two-dimensional (2D) virtual object. For example, the 3D virtual object may include a 3D view of a chair or an animated dinosaur. The 2D virtual object may include a 2D view of a dialog box, menu, or written information such as statistics information for properties or physical characteristics of the object (e.g., temperature, mass, velocity, tension, stress). An image of the virtual object may be rendered at the head mounted device or at a server in communication with the head mounted device.

A system and method for extracting data from analog and digital sensing devices that are "off-line" for AR content are described. In one example embodiment, a device includes at least one camera, a display, and a hardware processor. The hardware processor includes an augmented reality (AR) application. The AR application identifies a sensing device using an image captured with a camera of the device. Visual data is extracted from the sensing device. AR content is generated based on the extracted visual data, mapped and displayed in the display to form a layer on a view of the sensing device. The visual data is associated with a location of the sensing device in a monitoring computer system effectively making the sensing device "on-line."

In some example embodiments, feature points of objects in pictures received from the camera are identified. The sensing device is recognized from the features points of the sensing device in pictures received from the camera.

In some example embodiments, the AR application identifies measuring units associated with the sensing device, a range of the sensing device, and a measured level from the sensing device.

In some example embodiments, the AR application generates a virtual range indicator for the range of the sensing device, a virtual measured level indicator for the measured level from the sensing device, and a virtual digital gauge based on the measured level from the sensing device.

In some example embodiments, the AR application maps a first location in the display to display the virtual range indicator as a layer on the sensing device, a second location in the display to display the virtual measured level indicator as a layer on the sensing device, and a third location in the display to display the virtual digital gauge in the display.

In some example embodiments, the AR application accesses notification parameters related to the sensing device. The AR application then generates an alert notification in the display in response to the measured level exceeding a threshold of the notification parameters.

In some example embodiments, the AR application communicates the image of the sensing device to a server. The server extracts visual data from the image of the sensing device, and generates an AR server content based on the extracted visual data. The AR application receives the AR server content from the server.

In some embodiments, the AR application communicates the image of the sensing device to the server. The server identifies the sensing device from the image, extracts visual data from the image, accesses notification parameters associated with the identified sensing device, and generates an alert notification in the display in response to one of the visual data exceeding a threshold of the notification parameters. The AR application receives the alert notification from the server.

In some embodiments, the AR application identifies a geographic location of the head mounted device using a geolocation sensor in the head mounted device, and identifies the sensing device based on the image of the sensing device and the geographic location of the head mounted device.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an augmented reality application of a head mounted device, according to some example embodiments. The network environment 100 includes a head mounted device 101 and a server 110, communicatively coupled to each other via a network 108. The head mounted device 101 and the server 110 may each be implemented in a computer system, in whole or in part, as described below with respect to FIGS. 13 and 14.

The server 110 may be part of a network-based system. For example, the network-based system may be or include a cloud-based server system that provides additional information, such as 3D models or other virtual objects, to the head mounted device 101.

A user 102 may wear the head mounted device 101 to capture a view of a scene including several analog sensing devices (e.g., analog sensing device A 116, digital sensing device B 118) in a real world physical environment 114 viewed by the user 102. In one embodiment, analog sensing device A 116 and digital sensing device B 118 are "off-line." In other words, both are functional and generate a measurement. However, the measurement may not be communicated, connected to, or monitored by an external system (e.g., a monitoring computer system or server 110).

The user 102 may be a human user (e.g., a human being), a machine user (e.g., a computer configured by a software program to interact with the head mounted device 101), or any suitable combination thereof (e.g., a human assisted by a machine or a machine supervised by a human). The user 102 is not part of the network environment 100, but is associated with the head mounted device 101 and may be a user 102 of the head mounted device 101. For example, the head mounted device 101 may be a computing device with a camera and a display such as a smartphone, a tablet computer, a wearable computing device (e.g., watch or glasses). The computing device may be hand held or may be removably mounted to the head of the user 102. In one example, the display may be a screen that displays what is captured with a camera of the head mounted device 101. In another example, the display of the head mounted device 101 may be transparent or semi-transparent such as in lenses of wearable computing glasses or the visor or a face shield of a helmet.

The user 102 may be a user of an AR application in the head mounted device 101 and at the server 110. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, letters, etc. The user 102 may point a camera of the head mounted device 101 to capture an image of analog sensing device A 116 and digital sensing device B 118. The AR application then uploads or communicates the readings from both devices 116 and 118 to a monitoring computer system that is not connected to the devices 116 and 118. For example, the devices 116 and 118 are offline relative to the monitoring computer system. As such, the monitoring computer system now becomes aware of the status and reading of both devices 116 and 118 and can monitor and integrate the reading and status from devices 116 and 118 into a monitoring computer system even though they are not directly connected to the monitoring computer system. The reading and status of the devices 116 and 118 may be monitored through one or more head mounted device 101 in the physical environment 114 (e.g., factory) or other sensors 112.

In one embodiment, the objects in the image are tracked and recognized locally in the head mounted device 101 using a local context recognition dataset or any other previously stored dataset of the AR application of the head mounted device 101. The local context recognition dataset module may include a library of virtual objects associated with real-world physical objects or references. In one example, the head mounted device 101 identifies feature points in an image of the analog and digital sensing devices A 116, B 118 to determine different planes (e.g., edges, corners, surface, dial, letters). The head mounted device 101 may also identify tracking data related to the analog and digital sensing devices A 116, B 118 (e.g., GPS location of the head mounted device 101, orientation, distance to analog and digital sensing devices A 116, B 118). If the captured image is not recognized locally at the head mounted device 101, the head mounted device 101 can download additional information (e.g., 3D model or other augmented data) corresponding to the captured image, from a database of the server 110 over the network 108.

In another embodiment, the analog and digital sensing devices A 116, B 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects or references.

Sensors 112 may be associated with, coupled to, related to the analog and digital sensing devices A 116 and B 118 in the physical environment 114 to measure a reading of the analog and digital sensing devices A 116 and B 118. Examples of measured readings may include and but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the analog sensing devices A 116 and B 118 to show data related to the analog sensing devices A 116 and B 118. For example, the virtual indicators may include arrows with shapes and colors that change based on real-time data. The visualization may be provided to the head mounted device 101 so that the head mounted device 101 can render the virtual indicators in a display of the head mounted device 101. In another embodiment, the virtual indicators are rendered at the server 110 and streamed to the head mounted device 101. The head mounted device 101 displays the virtual indicators or visualization corresponding to a display of the physical environment 114 (e.g., data is displayed adjacent to the analog and digital sensing devices A 116 and B 118).

The sensors 112 may include other sensors used to track the location, movement, and orientation of the head mounted device 101 externally without having to rely on sensors internal to the head mounted device 101. The sensors 112 may include optical sensors (e.g., depth-enabled 3D camera), wireless sensors (Bluetooth, Wi-Fi), GPS sensors, and audio sensors to determine the location of the user 102 having the head mounted device 101, distance of the user 102 to the tracking sensors 112 in the physical environment 114 (e.g., sensors placed in corners of a venue or a room), the orientation of the head mounted device 101 to track what the user 102 is looking at (e.g., direction at which the head mounted device 101 is pointed, e.g., head mounted device 101 pointed towards a player on a tennis court, head mounted device 101 pointed at a person in a room).

In another embodiment, data from the sensors 112 and internal sensors in the head mounted device 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 held the head mounted device 101 when looking at the physical or virtual object, which features of the virtual object the user 102 interacted with (e.g., such as whether a user 102 tapped on a link in the virtual object), and any suitable combination thereof. The head mounted device 101 receives a visualization content dataset related to the analytics data. The head mounted device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 13 and 14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
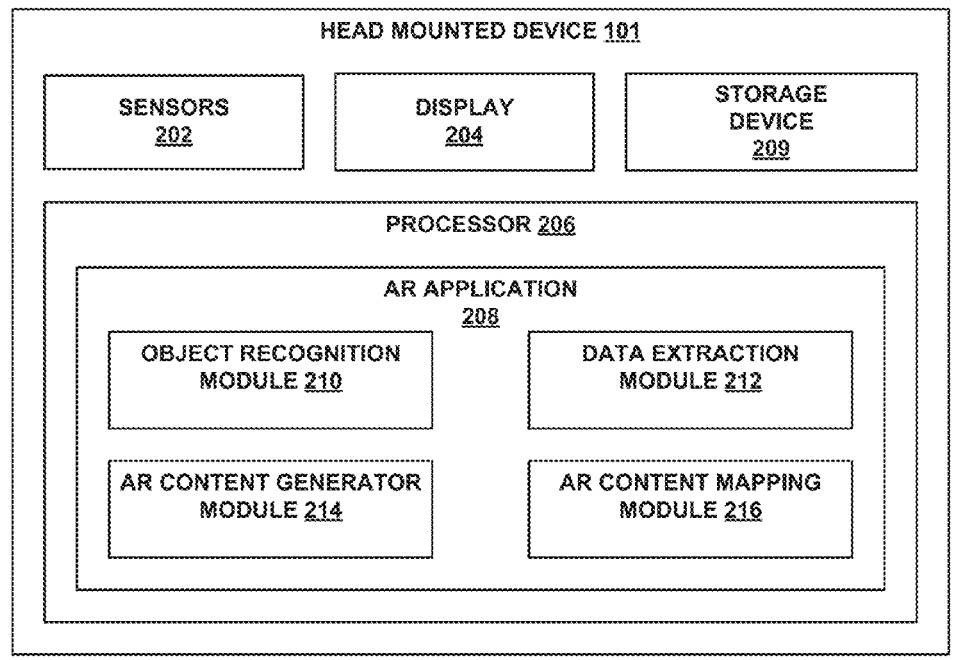
FIG. 2 is a block diagram illustrating an example embodiment of modules (e.g., components) of a head mounted device.

FIG. 2 is a block diagram illustrating modules (e.g., components) of the head mounted device 101, according to some example embodiments. The head mounted device 101 may include sensors 202, a display 204, a processor 206, and a storage device 209. For example, the head mounted device 101 may be a wearable computing device (e.g., glasses or helmet), a tablet computer, a navigational device, or a smart phone of a user. The user may be a human user (e.g., a human being), a machine user (e.g., a computer configured by a software program to interact with the head mounted device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor(s) (e.g., camera), an orientation sensor(s) (e.g., gyroscope, or an inertial motion sensor), an audio sensor (e.g., a microphone), or any suitable combination thereof. For example, the sensors 202 may include rear facing camera(s) and front facing camera(s) disposed in the head mounted device 101. It is noted that the sensors 202 described herein are for illustration purposes. Sensors 202 are thus not limited to the ones described. The sensors 202 may be used to generate internal tracking data of the head mounted device 101 to determine what the head mounted device 101 is capturing or looking at in the real physical world.

The display 204 may include a transparent visor or face shield of the helmet. The display 204 may also include a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include an AR application 208 for creating a virtual display of real-time data or augmented data related to an analog sensing device when the head mounted device 101 captures an image of a reading from the analog sensing device. In one example embodiment, the AR application 208 may include an object recognition module 210, a data extraction module 212, an AR content generator module 214, and an AR content mapping module 216.

Figure 3:
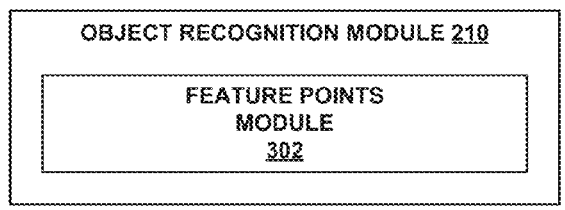
FIG. 3 is a block diagram illustrating an example embodiment of an object recognition module.

The object recognition module 210 identifies the object that the head mounted device 101 is pointed to. The object recognition module 210 may detect, generate, and identify identifiers such as feature points of the physical object being viewed or pointed at by the head mounted device 101 using an optical device of the head mounted device 101 to capture the image of the physical object. As such, the object recognition module 210 may be configured to identify one or more physical objects. In one example embodiment, the object recognition module 210 may include a feature points module 302 as illustrated in FIG. 3. The identification of the object may be performed in many different ways. For example, the feature points module 302 may determine feature points of the object based on several image frames of the object. The feature points module 302 also determines the identity of the object using any visual recognition algorithm. In another example, a unique identifier may be associated with the object. The unique identifier may be a unique wireless signal or a unique visual pattern such that the recognition module 210 can look up the identity of the object based on the unique identifier from a local or remote content database. The feature points module 302 may be configured to identify feature points of analog and digital sensing devices 116 and 118 (e.g., a round dial of a gauge).

Figure 4:
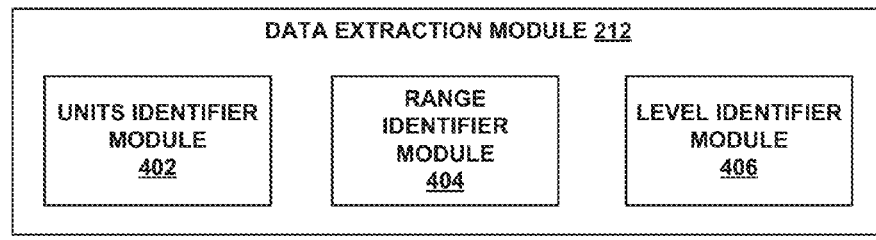
FIG. 4 is a block diagram illustrating an example embodiment of modules of a data extraction module.

The data extraction module 212 determines a current reading from the analog or digital sensing device, a range of the analog or digital sensing device, a type of analog or digital sensing device based on an image of the analog or digital sensing device. In one example embodiment, the data extraction module 212 may include a units identifier module 402, a range identifier module 404, and a level identifier module 406 as illustrated in FIG. 4.

The units identifier module 402 identifies measuring units associated with the sensing device. For example, the units identifier module 402 may identify a label in the middle of a gauge and determine that the gauge measures pressure in psi.

The range identifier module 404 identifies a range of the sensing device. For example, the range identifier module 404 may identify a minimum level and a maximum level.

The level identifier module 406 identifies a measured level or a current reading from the sensing device. For example, the level identifier module 406 identifies a position of a needle or hand from an analog or digital sensing device. The level identifier module 406 then identifies its position relative to the minimum and maximum levels or other indicators in the gauge or dial.

Figure 5:
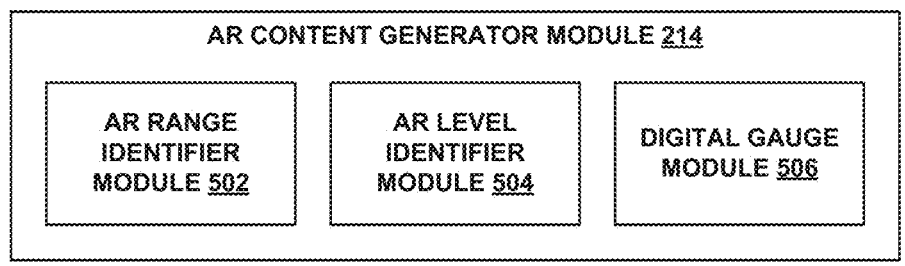
FIG. 5 is a block diagram illustrating an example embodiment of modules of an AR content generator module.

The AR content generator module 214 may generate AR content based on the data extracted from the sensing device using the data extraction module 212. The AR content may include visualization of the reading data from the analog or digital device. The visualization may include rendering a 3D object (e.g., a virtual frame around a gauge), a 2D object (e.g., an arrow or symbol next to the gauge), displaying other objects in different colors on the sensing device. In one example embodiment, the AR content generator module 214 receives data from the server 110 to render the visualization. The AR content may include a digital reading of the extracted data. In one example embodiment, the AR content generator module 214 may include an AR range identifier module 502, an AR level identifier module 504, and a digital gauge module 506 as illustrated in FIG. 5.

The AR range identifier module 502 generates a virtual range indicator for the range of the sensing device. For example, the virtual range indicator may include a virtual 2D or 3D object indicating a range of the sensing device.

The AR level identifier module 504 generates a virtual measured level indicator for the measured level from the sensing device. For example, the virtual measured indicator for the measured level may include a virtual 2D or 3D arrow or indicator identifying a measured level of the sensing device.

The digital gauge module 506 generates a virtual digital gauge based on the measured level from an analog sensing device. For example, virtual digital gauge may include a current level number, a maximum number, a minimum number and a threshold number for the analog sensing device.

Figure 6:
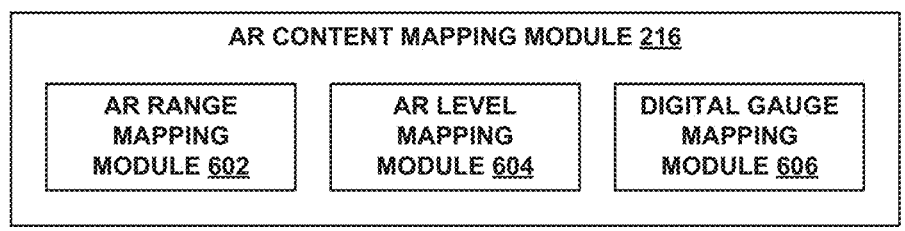
FIG. 6 is a block diagram illustrating an example embodiment of modules of an AR content mapping module.

Referring back to FIG. 2, the AR content mapping module 216 determines the position and size of the rendered object to be displayed in relation to an image or a view of the analog sensing device. For example, the AR content mapping module 216 may map and display animation or other graphics as a layer on top of the sensing device. The AR content mapping module 216 may track the image of the sensing device and render the virtual object based on the position of the image of the sensing device in a display of the head mounted device 101. In another example, the AR content mapping module 216 may render portions of the objects or the scene in different colors based on the data extracted from the sensing device. A general red hue may be displayed when a level reading of the sensing device exceeds a predetermined threshold. In one example embodiment, the AR content mapping module 216 may include an AR range mapping module 602, an AR level mapping module 604, and a digital gauge mapping module 606 as illustrated in FIG. 6.

The AR range mapping module 602 maps a first location in the display to display the virtual range indicator as a visual layer on the sensing device. The AR level mapping module 604 maps a second location in the display to display the virtual measured level indicator as a visual layer on the sensing device. The digital gauge mapping module 606 maps a third location in the display to display the virtual digital gauge in the display.

Referring back to FIG. 2, in one example embodiment, the head mounted device 101 accesses from the storage device 209, a visualization model (e.g., vector shapes) corresponding to the image of the object (e.g., analog and digital sensing devices). In another example, the head mounted device 101 receives a visualization model corresponding to the object from the server 110. The head mounted device 101 then renders the visualization model to be displayed in relation to an image of the object being displayed in the head mounted device 101 or in relation to a position and orientation of the head mounted device 101 relative to the object. The AR application 208 may adjust a position of the rendered visualization model in the display 204 to correspond with the last tracked position of the object (as last detected either from the sensors 202 of the head mounted device 101 or from the tracking sensors 112 of the server 110).

In another example embodiment, the AR content mapping module 216 may include a local rendering engine that generates a visualization of a 3D virtual object overlaid on (e.g., superimposed upon, or otherwise displayed in tandem with)

an image of a physical object captured by a camera of the head mounted device 101 in the display 204 of the head mounted device 101. A visualization of the 3D virtual object may be manipulated by adjusting a position of the physical object (e.g., its physical location, orientation, or both) relative to the camera of the head mounted device 101. Similarly, the visualization of the 3D virtual object may be manipulated by adjusting a position of the camera of the head mounted device 101 relative to the physical object.

In another example embodiment, the AR content generator module 214 may retrieve 3D models of virtual objects associated with a captured real world object. For example, the captured image may include a visual reference (also referred to as a marker) that consists of an identifiable image, symbol, letter, number, machine-readable code. For example, the visual reference may include a bar code, a quick response (QR) code, or an image that has been previously associated with a 3D virtual object (e.g., an image that has been previously determined to correspond to the three-dimensional virtual object). For example, a QR or other indicator may be visibly affixed next to an analog sensing device or other object.

In one example embodiment, the object recognition module 210 may include a manipulation module that identifies the physical object (e.g., a physical telephone), accesses virtual functions (e.g., increases or lowers the volume of a nearby television) associated with physical manipulations (e.g., lifting a physical telephone handset) of the physical object, and generates a virtual function corresponding to a physical manipulation of the physical object.

The storage device 209 may be configured to store a database of identifiers of analog and digital sensing devices 116 and 118, corresponding thresholds, physical objects, tracking data, and corresponding virtual user interfaces. In another embodiment, the database may also include visual references (e.g., images) and corresponding experiences (e.g., 3D virtual objects, interactive features of the 3D virtual objects). In one embodiment, the storage device 209 includes a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular magazines and their corresponding experiences (e.g., virtual objects that represent the ten most common analog sensing devices in a factory floor). In another example, the server 110 may generate the first set of images based on the most popular or often scanned images received at the server 110. Thus, the primary content dataset does not depend on objects or images scanned by the object recognition module 210 of the head mounted device 101.

The contextual content dataset includes, for example, a second set of images and corresponding experiences (e.g., three-dimensional virtual object models) retrieved from the server 110. For example, images captured with the head mounted device 101 that are not recognized (e.g., by the server 110) in the primary content dataset are submitted to the server 110 for recognition. If the captured image is recognized by the server 110, a corresponding experience may be downloaded at the head mounted device 101 and stored in the contextual content dataset. Thus, the contextual content dataset relies on the context in which the head mounted device 101 has been used. As such, the contextual content dataset depends on objects or images scanned by the object recognition module 210 of the head mounted device 101.

In one embodiment, the head mounted device 101 may communicate over the network 108 with the server 110 to retrieve a portion of a database of visual references, corresponding 3D virtual objects, and corresponding interactive features of the 3D virtual objects. The network 108 may be any network that enables communication between or among machines, databases, and devices (e.g., the head mounted device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
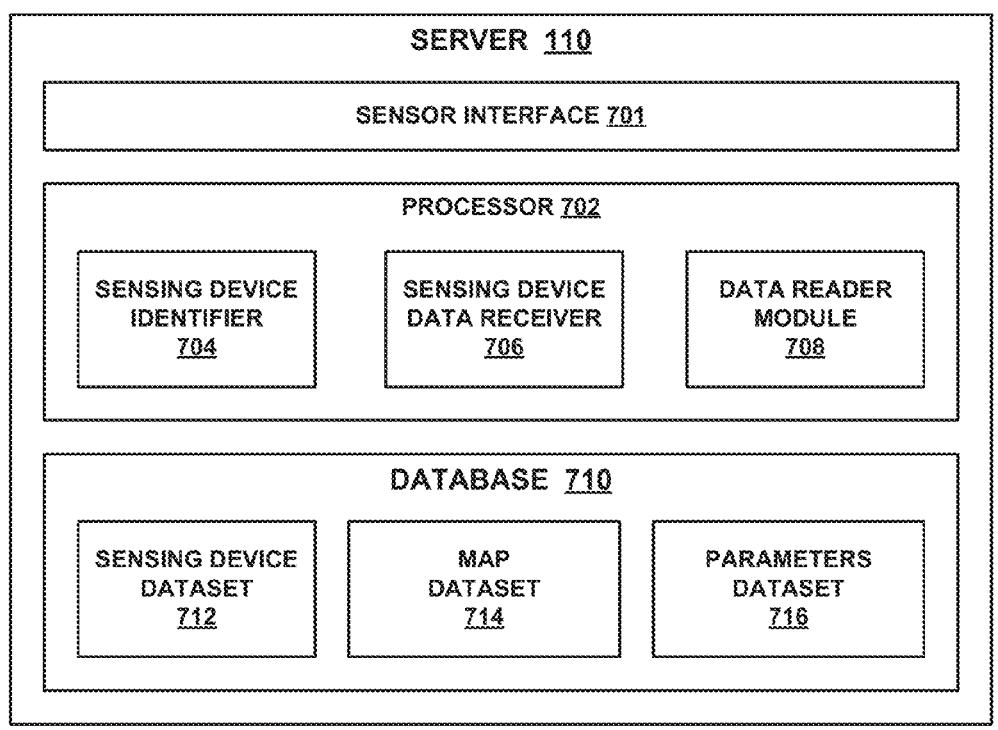
FIG. 7 is a block diagram illustrating an example embodiment of a server for extracting data from devices for AR content.

FIG. 7 is a block diagram illustrating modules (e.g., components) of the server 110. The server 110 includes a sensor interface 701, a processor 702, and a database 710. The sensor interface 701 may communicate with the sensors 112 (FIG. 1) to receive real time data.

The processor 702 may include a sensing device identifier 704, a sensing device data receiver 706, a data reader module 708. The sensing device identifier 704 may operate similarly to the object recognition module 210 of the head mounted device 101. For example, the sensing device identifier 704 may identify analog and digital sensing devices A 116 and B 118 based on a picture or video frame received from the head mounted device 101. In another example, the head mounted device 101 already has identified analog and digital sensing devices A 116 and B 118 and has provided the identification information to the sensing device identifier 704. For example, the identification information may include a type of gauge, a brand of the gauge, a model of the gauge, units of the gauge, a location of the gauge, an orientation of the gauge, a temperature of the gauge, a humidity level of the gauge, etc.

The database 710 may store a sensing device dataset 712, a map dataset 714, and a parameters dataset 716. The sensing device dataset 712 may store a database of images of sensing devices and corresponding identifiers and parameters. The sensing device dataset 712 may tie a particular sensing device with a particular machine or a particular location in a factory. The map dataset includes a floor plan map of a physical environment (e.g., factory), or a map of machine locations. The parameters dataset 716 may include safety parameters associated with each sensing device. For example, device 123 has a safe reading between reading 1 and a reading 2, or other acceptable thresholds that may be dependent from other sensing devices in the same physical environment (e.g., within a same factory).

Figure 8:
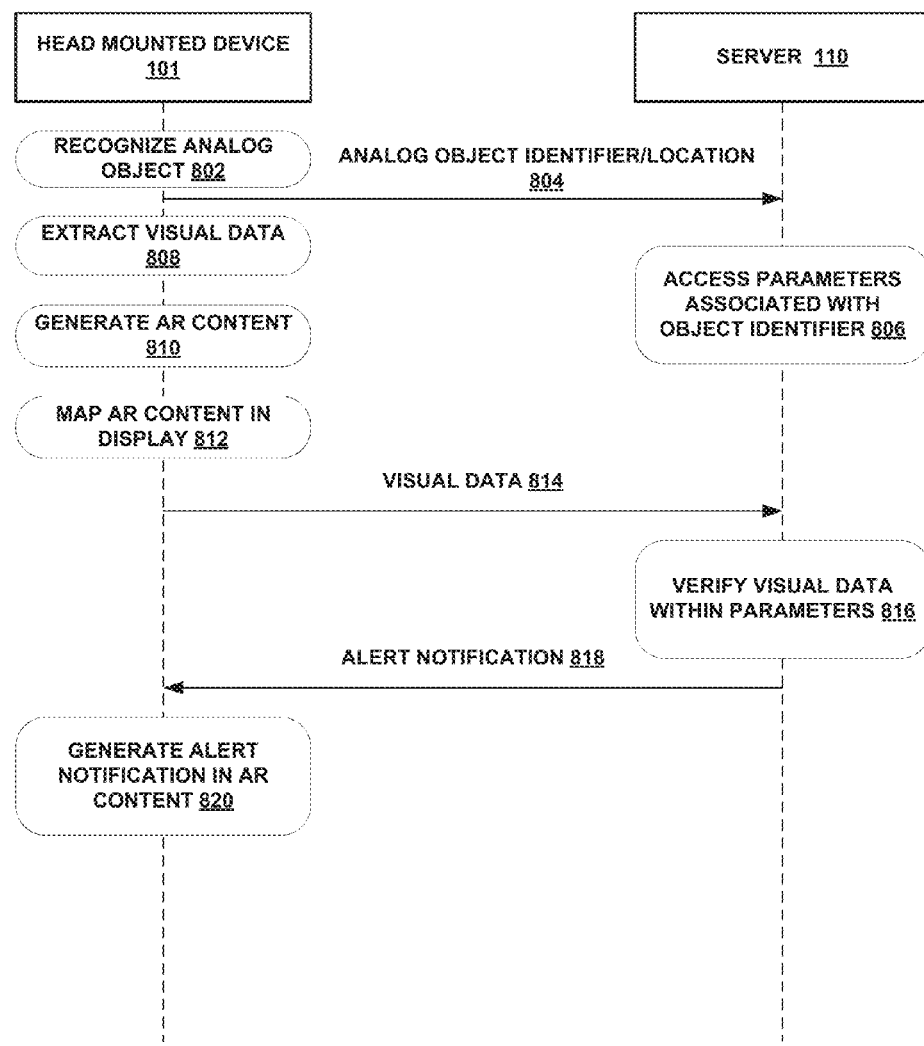
FIG. 8 is an interaction diagram illustrating an example embodiment of an operation of extracting data from devices for AR content.

FIG. 8 is a ladder diagram illustrating an example embodiment of an operation of extracting data from offline devices for AR content. At operation 802, the head mounted device 101 identifies and recognizes analog and digital sensing devices A 116 and B 118 in a scene and tracks data related to the analog and digital sensing devices A 116 and B 118 (e.g., reading, position, type of sensor) being captured by the head mounted device 101. At operation 804, the head mounted device 101 communicates the identity and location of the analog and digital sensing devices A 116 and B 118 to the server 110. At operation 806, the server 110 retrieves parameters associated with the identified analog and digital sensing device. At operation 808, the head mounted device 101 extracts visual data from the sensing device and generates AR content based on the extracted data at operation 810. At operation 812, the AR content is mapped to a view of the sensing device to render a virtual layer on top of the sensing device as perceived by the user 102 of the head mounted device 101. At operation 814, the head mounted device 101 communicates the visual data (e.g., a current level reading) to the server 110. At operation 816, the server 110 verifies that the visual data is within the parameters corresponding to the sensing device. At operation 818, the server 110 generates an alert notification to the head mounted device 101 based on the visual data being outside acceptable thresholds. At operation 820, the head mounted device 101 generates an alert based on the alert notification from the server 110. The alert may include a virtual indicator in the display 204 of the head mounted device 101.

Figure 9:
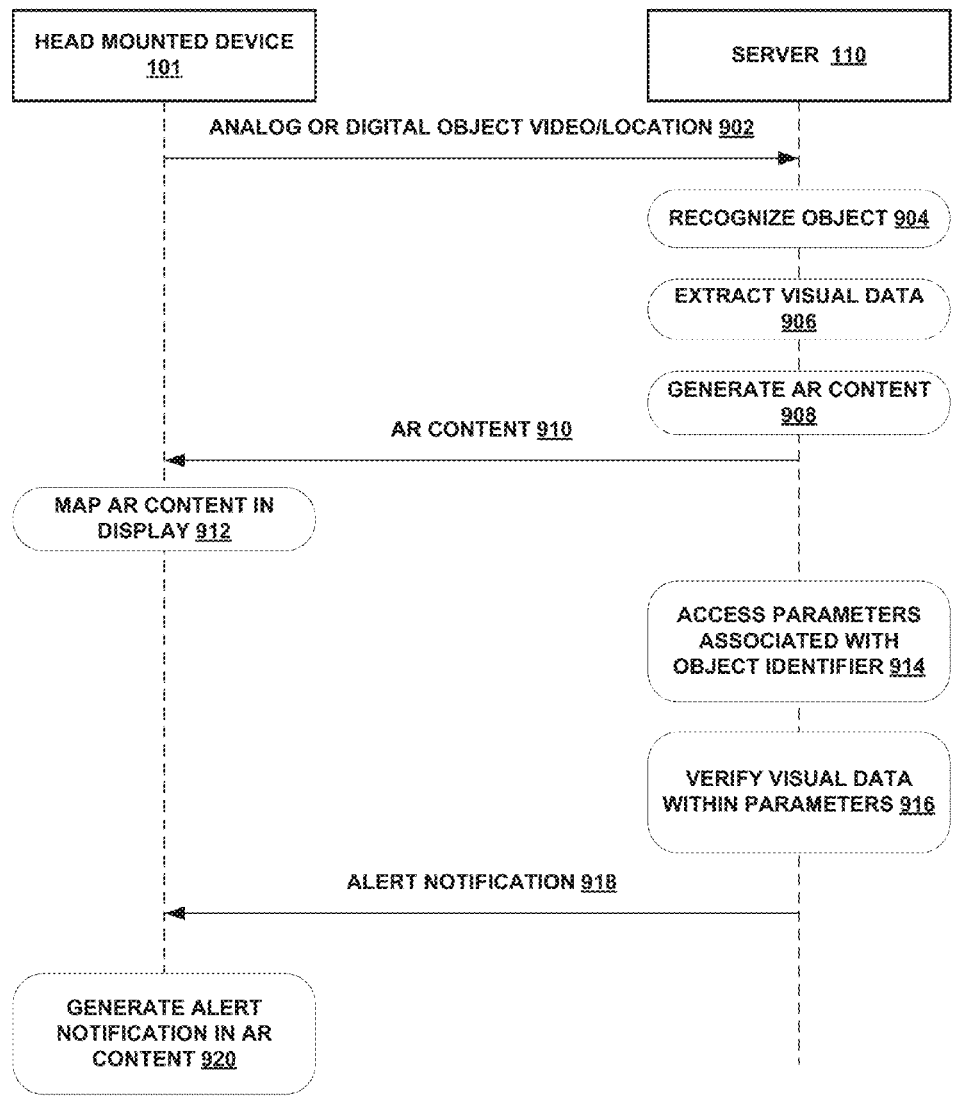
FIG. 9 is a ladder diagram illustrating another example embodiment of an operation of extracting data from devices for AR content.

FIG. 9 is a ladder diagram illustrating another example embodiment of an operation of extracting data from sensing devices for AR content. At operation 902, the head mounted device 101 communicates an image and location of analog and digital sensing devices A 116 and B 118. At operation 904, the server 110 recognizes the analog and digital sensing devices A 116 and B 118 and extracts visual analog data at operation 906. At operation 908, the server 110 generates AR content based on the visual analog data. At operation 910, the server 110 sends the AR content to the head mounted device 101. At operation 912, the AR content is mapped to a view of the sensing device to render a virtual layer on top of the sensing device as perceived by the user 102 of the head mounted device 101. At operation 914, the server 110 accesses predefined parameters associated with the identified sensing device. At operation 916, the server 110 verifies that the visual data is within the parameters corresponding to the sensing device. At operation 918, the server 110 generates an alert notification to the head mounted device 101 based on the visual data being outside acceptable thresholds. At operation 920, the head mounted device 101 generates an alert based on the alert notification from the server 110. The alert may include a virtual indicator in the display 204 of the head mounted device 101.

Figure 10:
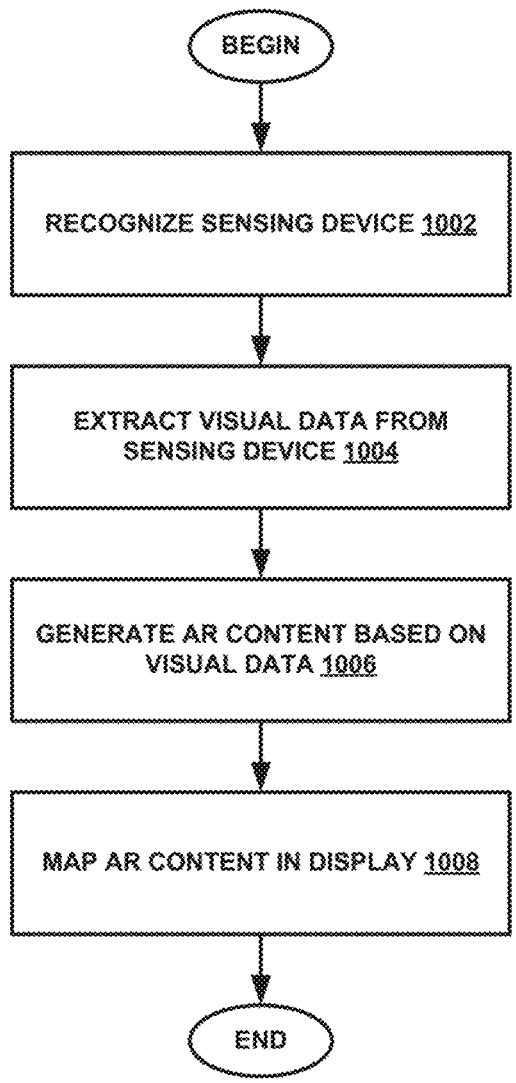
FIG. 10 is a flowchart illustrating an example method of extracting data from devices for AR content.

FIG. 10 is a flowchart illustrating an example method of extracting data from analog devices (e.g., analog and digital sensing devices A 116 and B 118) for AR content. At operation 1002, an AR application of a head mounted device (e.g., head mounted device 101) recognizes a sensing device. In one embodiment, operation 1002 may be implemented with the object recognition module 210 of the AR application 208 in FIG. 2. At operation 1004, the AR application 208 extracts visual data from the sensing device. In one embodiment, operation 1004 may be implemented with the data extraction module 212. At operation 1006, the AR application 208 generates AR content based on the visual data. In one embodiment, operation 1006 may be implemented with the AR content generator module 214. At operation 1008, the AR application 208 maps the AR content in a display of the head mounted device. In one embodiment, operation 1008 may be implemented with the AR content mapping module 216 of AR application 208.

Figure 11:
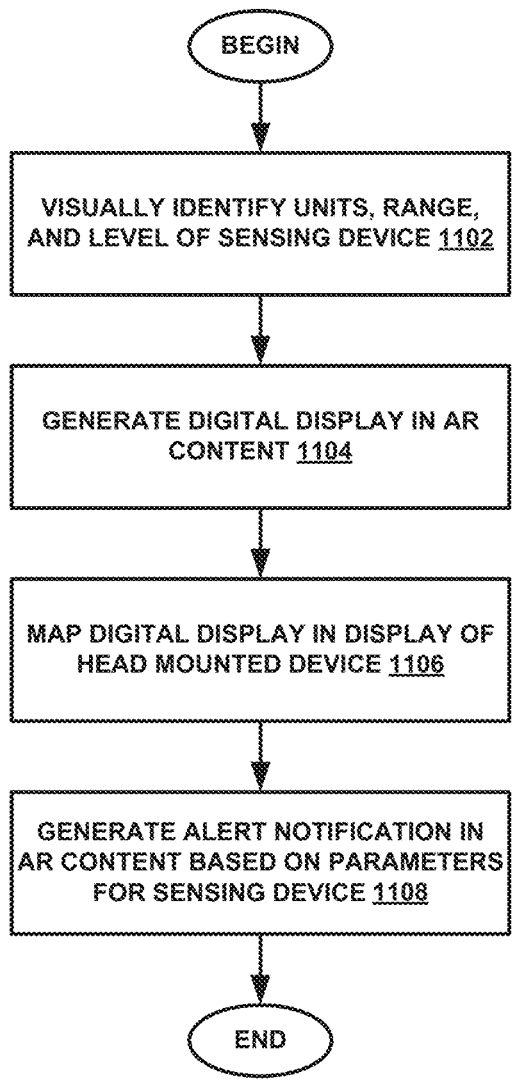
FIG. 11 is a flowchart illustrating an example method of mapping AR content based on extracted data from devices.

FIG. 11 is a flowchart illustrating an example method of mapping AR content based on extracted data from analog devices (e.g., analog and digital sensing devices A 116 and B 118). At operation 1102, an AR application (e.g., AR application 208) of a head mounted device (e.g., head mounted device 101) identifies, from pictures of the sensing device, units, range and level of the sensing device. In one embodiment, operation 1102 may be implemented with the object recognition module 210 of the AR application 208 in FIG. 2. At operation 1104, the AR application generates a digital display of AR content in the display of the head mounted device. In one embodiment, operation 1104 may be implemented with the AR content generator module 214. At operation 1106, the AR application maps the AR content in a display of the head mounted device. In one embodiment, operation 1106 may be implemented with the AR content mapping module 216 of AR application 208. At operation 1108, the AR application generates an alert notification in the AR content based on predefined parameters of the corresponding sensing device.

Figure 12A:
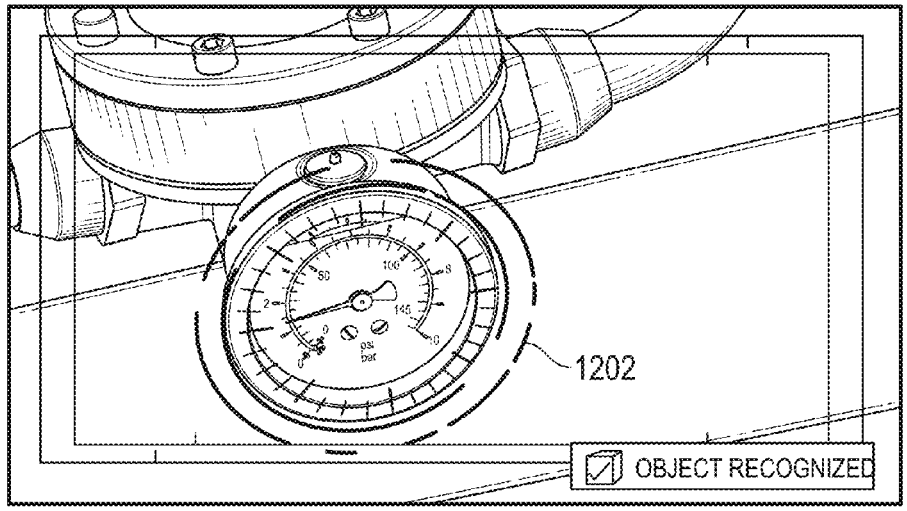
FIG. 12A is a diagram illustrating an example of a display of a head mounted device identifying an analog device.

FIG. 12A is a diagram illustrating an example of a display of a head mounted device (e.g., head mounted device 101) identifying an analog device. A virtual indicator 1202 is shown around the analog device to indicate that the object is recognized.

Figure 12B:
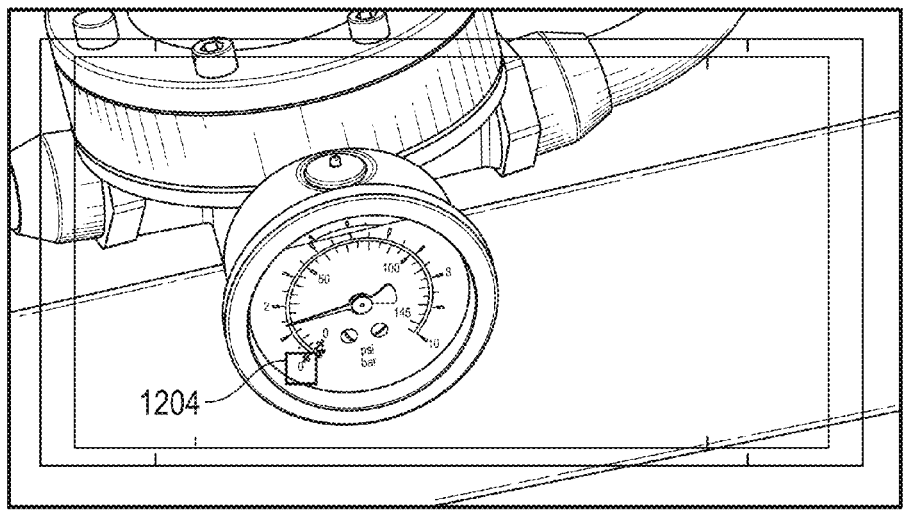
FIG. 12B is a diagram illustrating an example of a display of a head mounted device identifying a lower limit of an analog device.

FIG. 12B is a diagram illustrating an example of a display of a head mounted device (e.g., head mounted device 101) identifying a lower limit of an analog device. A minimum level 1204 of the analog device is identified.

Figure 12C:
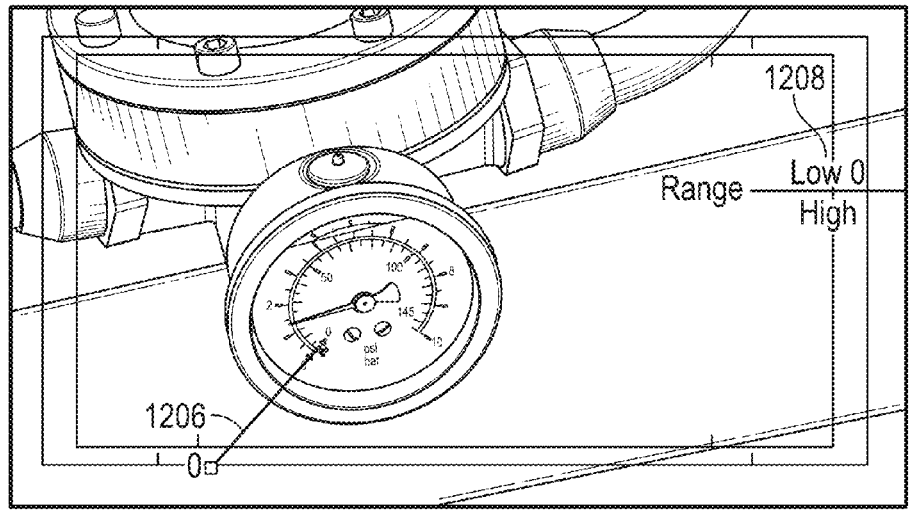
FIG. 12C is a diagram illustrating an example of a display of a head mounted device displaying AR content identifying a lower limit of an analog device.

FIG. 12C is a diagram illustrating an example of a display of a head mounted device (e.g., head mounted device 101) displaying AR content identifying a lower limit of an analog device. A virtual indicator 1206 for the minimum level is displayed. A range 1208 is also displayed with the low level corresponding to the minimum level.

Figure 12D:
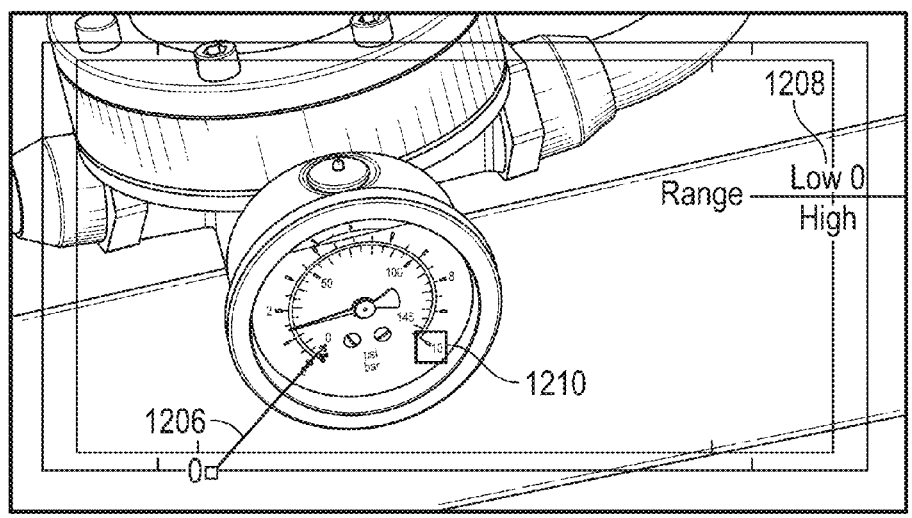
FIG. 12D is a diagram illustrating an example of a display of a head mounted device identifying an upper limit of an analog device.

FIG. 12D is a diagram illustrating an example of a display of a head mounted device (e.g., head mounted device 101) identifying an upper limit of an analog device. A maximum level 1210 of the analog device is identified.

Figure 12E:
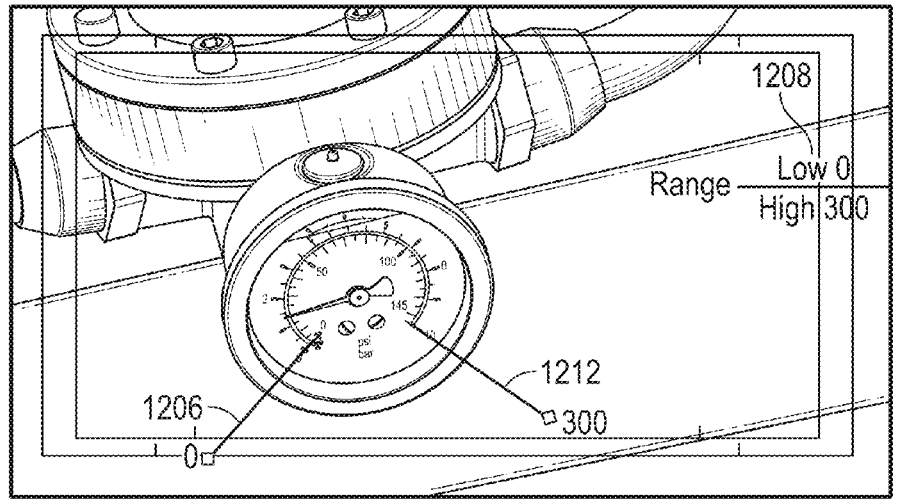
FIG. 12E is a diagram illustrating an example of a display of a head mounted device displaying AR content identifying a lower limit and an upper limit of an analog device.

FIG. 12E is a diagram illustrating an example of a display of a head mounted device (e.g., head mounted device 101) displaying AR content identifying a lower limit and an upper limit of an analog device. A virtual indicator 1212 for the maximum level is displayed. The range 1208 is updated with the high level corresponding to the maximum level.

Figure 12F:
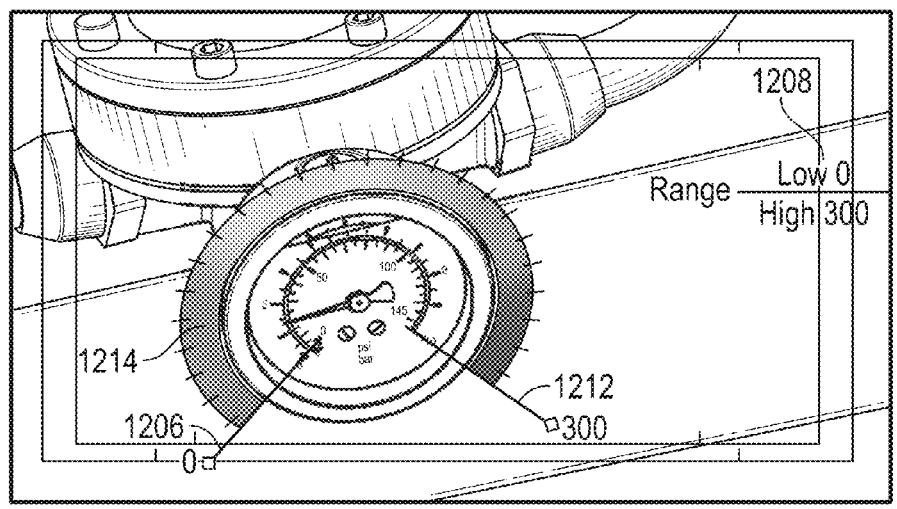
FIG. 12F is a diagram illustrating an example of a display of a head mounted device displaying AR content identifying a range of an analog device.

FIG. 12F is a diagram illustrating an example of a display of a head mounted device (e.g., head mounted device 101) displaying AR content identifying a range of an analog device. A virtual range 1214 is displayed around the dial of the analog device.

Figure 12G:
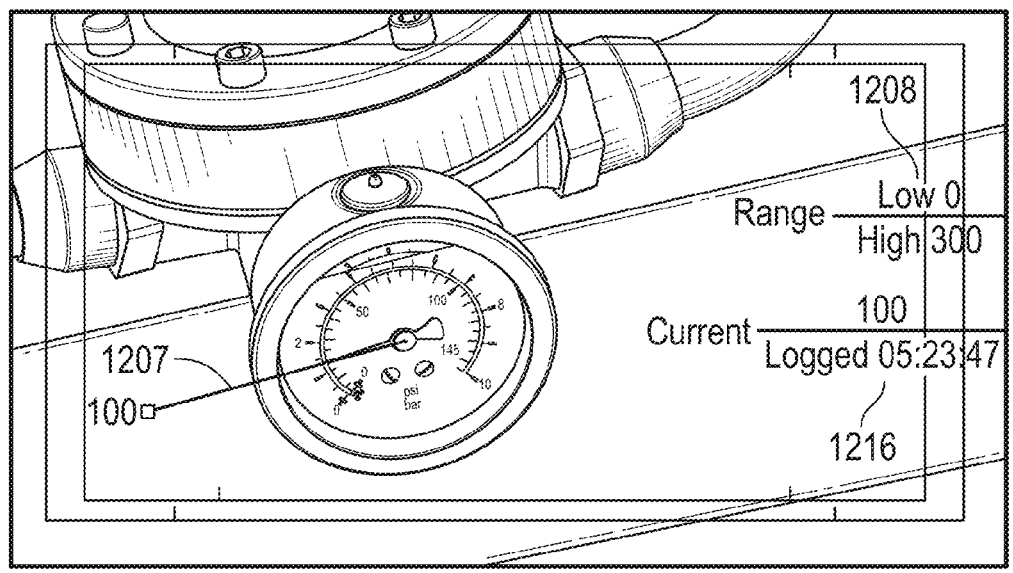
FIG. 12G is a diagram illustrating an example of a display of a head mounted device displaying AR content identifying a reading from an analog device.

FIG. 12G is a diagram illustrating an example of a display of a head mounted device (e.g., head mounted device 101) displaying AR content identifying a reading from an analog device. A virtual indicator 1207 is displayed corresponding to a current level reading. A digital current level reading 1216 is displayed showing the current level and how long the analog device has stayed at the current level.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
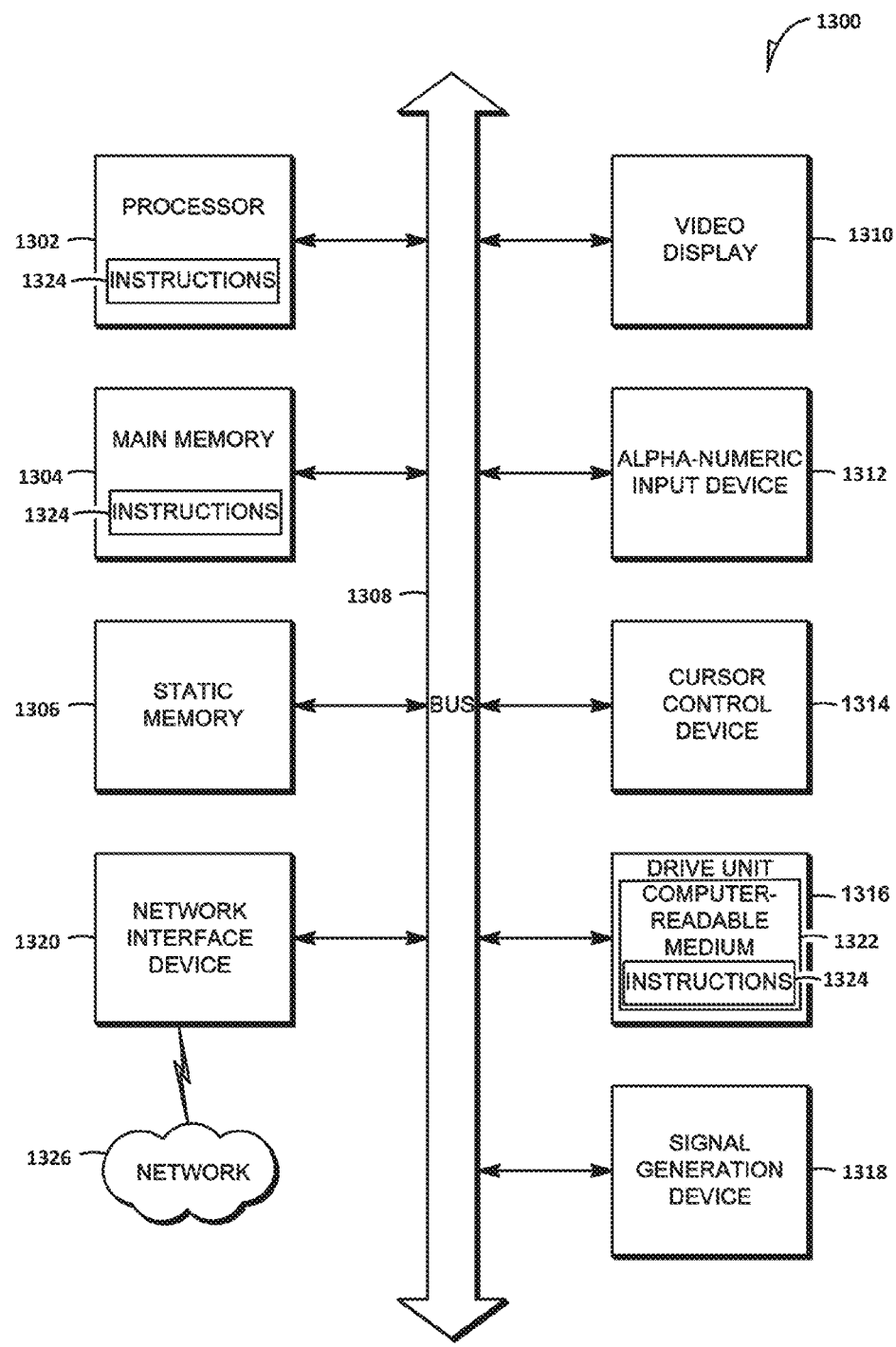
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions 1324 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a computer-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 14:
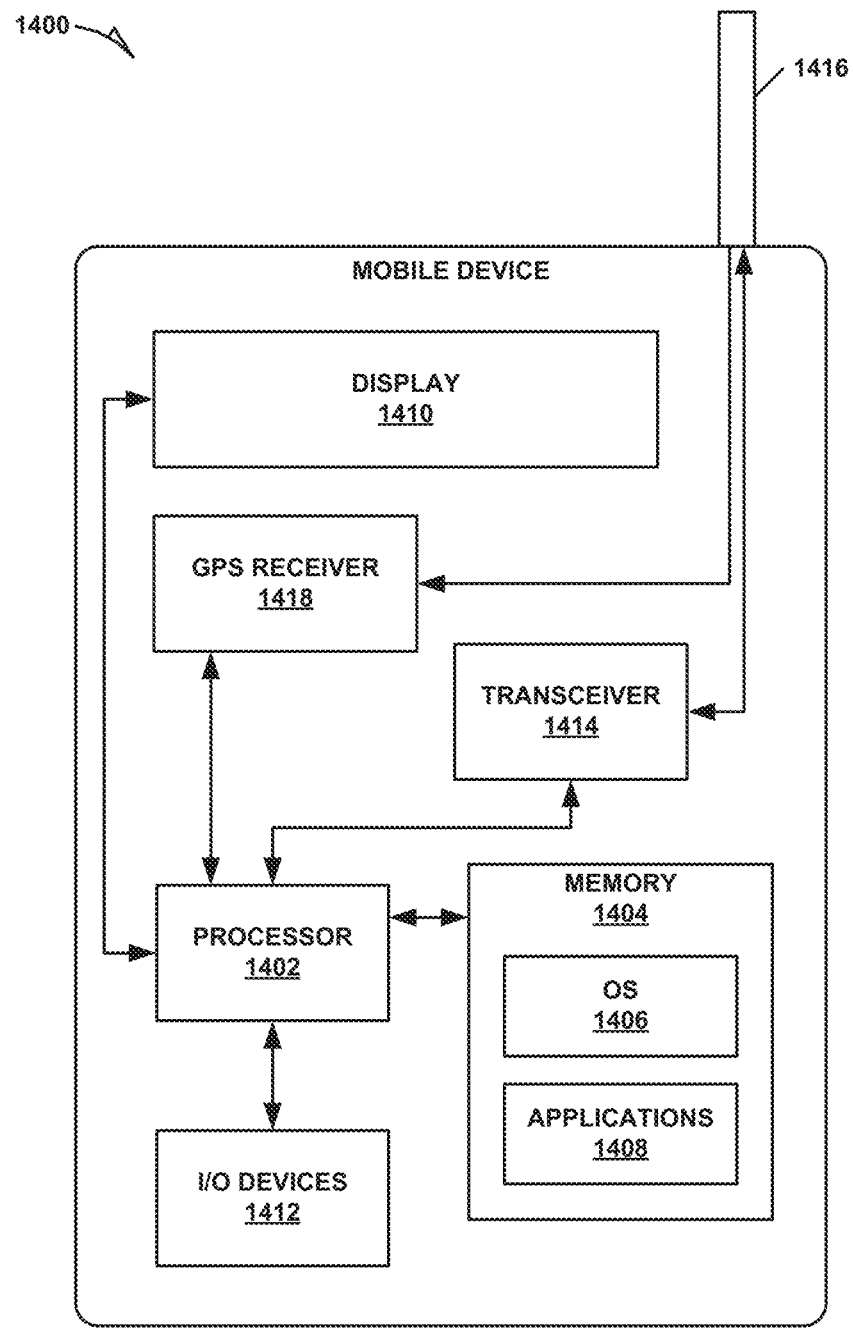
FIG. 14 is a block diagram illustrating a mobile device, according to an example embodiment, configured to perform perform any one or more of the methodologies discussed herein.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
   at least one camera;
   a display; and
   a hardware processor comprising an augmented reality (AR) application, the AR application configured to include:
      an object recognition module to identify a sensing device, an image of which is captured with the at least one camera of the device;
      a data extraction module to extract visual data from the sensing device;
      an AR content generator to generate AR content based on the extracted visual data; and
      an AR content mapping module to map the AR content in the display to form a layer visually perceived on the sensing device.

2. The device of claim 1, wherein the object recognition module further comprises:
   a feature points module to identify feature points of objects in pictures received from the at least one camera, and to recognize the sensing device from the feature points of the sensing device in pictures received from the at least one camera.

3. The device of claim 1, wherein the data extraction module further comprises:
   a units identifier module to identify measuring units associated with the sensing device;
   a range identifier module to identify a range of the sensing device; and
   a level identifier module to identify a measured level from the sensing device.

4. The device of claim 3, wherein the AR content generator further comprises:
   an AR range identifier module to generate a virtual range indicator for the range of the sensing device;
   an AR level identifier module to generate a virtual measured level indicator for the measured level from the sensing device; and
   a digital gauge module to generate a virtual digital gauge based on the measured level from the sensing device.

5. The device of claim 4, wherein the AR content mapping module further comprises:
   an AR range mapping module to map a first location in the display to display the virtual range indicator as a layer on the sensing device;
   an AR level identifier module to map a second location in the display to display the virtual measured level indicator as a layer on the sensing device; and
   a digital gauge module to map a third location in the display to display the virtual digital gauge in the display.

6. The device of claim 3, wherein the sensing device comprises a gauge with a dial, and further:
   the units identifier module to identify measuring units displayed in a center of the dial;
   the range identifier module to identify a range of the gauge based on a minimum range level and a maximum range level, both displayed in the dial; and
   the level identifier module to identify the measured level from the sensing device based on a dial position relative to the gauge.

7. The device of claim 1, wherein the AR content generator is to access notification parameters related to the sensing device, and to generate an alert notification in the display in response to a measured level exceeding a threshold of the notification parameters.

8. The device of claim 1, wherein the AR application is to communicate the image of the sensing device to a server, to receive AR server content from the server, the server to extract visual data from the image of the sensing device, and generate the AR server content based on the extracted visual data, the server not in communication with the sensing device.

9. The device of claim 1, wherein the AR application is to communicate the image of the sensing device to a server, the server to identify the sensing device from the image, to extract visual data from the image, to access notification parameters associated with the identified sensing device, to generate an alert notification in the display in response to one of the visual data exceeding a threshold of the notification parameters.

10. The device of claim 1, further comprising:
    a geolocation sensor to identify a geographic location of the device, wherein the object recognition module is to identify the sensing device based on the image of the sensing device and the geographic location of the device.

11. A method comprising:
    identifying a sensing device using an image captured with at least one camera of a device;
    extracting, by a hardware processor, visual data from the sensing device;
    generating augmented reality (AR) content based on the extracted visual data; and
    mapping and displaying the AR content in a display to form a layer visually perceived on the sensing device.

12. The method of claim 11, further comprising:
    identifying feature points of objects in pictures received from the at least one camera; and
    recognizing the sensing device from the features points of the sensing device in pictures received from the at least one camera.

13. The method of claim 11, further comprising:
    identifying measuring units associated with the sensing device;
    identifying a range of the sensing device; and
    identifying a measured level from the sensing device.

14. The method of claim 13, further comprising:
    generating a virtual range indicator for the range of the sensing device;
    generating a virtual measured level indicator for the measured level from the sensing device; and
    generating a virtual digital gauge based on the measured level from the sensing device.

15. The method of claim 14, further comprising:
mapping a first location in the display to display the virtual range indicator as a layer on the sensing device;
mapping a second location in the display to display the virtual measured level indicator as a layer visually perceived on the sensing device; and
mapping a third location in the display to display the virtual digital gauge in the display.

16. The method of claim 14, further comprising:
accessing notification parameters related to the sensing device; and
generating an alert notification in the display in response to the measured level exceeding a threshold of the notification parameters.

17. The method of claim 11, further comprising:
communicating the image of the sensing device to a server; and
receiving an AR server content from the server, the server to extract visual data from the image of the sensing device, and generate the AR server content based on the extracted visual data, the server not in communication with the sensing device.

18. The method of claim 11, further comprising:
communicating the image of the sensing device to a server, the server to identify the sensing device from the image, to extract visual data from the image, to access notification parameters associated with the identified sensing device, to generate an alert notification in the display in response to one of the visual data exceeding a threshold of the notification parameters; and
receiving the alert notification from the server.

19. The method of claim 11, further comprising:
identifying a geographic location of the device using a geolocation sensor in the device; and
identifying the sensing device based on the image of the sensing device and the geographic location of the device.

20. A non-transitory machine-readable medium comprising instructions that, when executed by one or more processors of a machine, cause the machine to perform operations comprising:
identifying a sensing device using an image captured with at least one camera of a device;
extracting visual data from the sensing device;
generating AR content based on the extracted visual data; and
mapping and displaying the AR content in a display to form a layer visually perceived on the sensing device.

* * * * *